United States Patent
Eskander et al.

(10) Patent No.: US 10,032,307 B2
(45) Date of Patent: Jul. 24, 2018

(54) SYSTEMS AND METHODS FOR A GENERATING AN INTERACTIVE 3D ENVIRONMENT USING VIRTUAL DEPTH

(71) Applicant: Viacom International Inc., New York, NY (US)

(72) Inventors: Tamer Eskander, New York, NY (US); Isaac Steele, New York, MA (US)

(73) Assignee: VIACOM INTERNATIONAL INC., New York, NY (US)

( * ) Notice: Subject to any disclaimer, the term of this patent is extended or adjusted under 35 U.S.C. 154(b) by 99 days.

(21) Appl. No.: 15/233,823

(22) Filed: Aug. 10, 2016

(65) Prior Publication Data

US 2018/0047207 A1 Feb. 15, 2018

(51) Int. Cl.
*G06T 15/00* (2011.01)
*G06T 15/20* (2011.01)
*H04N 13/02* (2006.01)

(52) U.S. Cl.
CPC ....... *G06T 15/205* (2013.01); *H04N 13/0271* (2013.01)

(58) Field of Classification Search
CPC .................................. G06T 19/00; G06T 17/20
USPC ........................................................ 345/419
See application file for complete search history.

(56) References Cited

U.S. PATENT DOCUMENTS

| 5,519,790 | A | * | 5/1996 | Manning | H04N 5/21 348/415.1 |
|---|---|---|---|---|---|
| 7,477,777 | B2 | | 1/2009 | Wells | |
| 8,111,254 | B2 | | 2/2012 | Jang et al. | |
| 8,405,680 | B1 | * | 3/2013 | Cardoso Lopes | G06T 19/00 345/426 |
| 8,629,871 | B2 | | 1/2014 | O'Brien et al. | |
| 8,805,007 | B2 | | 8/2014 | Zhang | |
| 2004/0222988 | A1 | | 11/2004 | Donnelly | |
| 2007/0159476 | A1 | * | 7/2007 | Grasnick | H04N 13/0275 345/419 |
| 2009/0021513 | A1 | * | 1/2009 | Joshi | G06T 15/503 345/419 |
| 2009/0079743 | A1 | | 3/2009 | Pearson et al. | |
| 2014/0079314 | A1 | | 3/2014 | Yakubovich et al. | |
| 2015/0334418 | A1 | | 11/2015 | Shimizu | |

* cited by examiner

*Primary Examiner* — Jin Ge
(74) *Attorney, Agent, or Firm* — Fay Kaplun & Marcin, LLP

(57) ABSTRACT

Described herein are apparatuses, systems and methods for generating an interactive three-dimensional ("3D") environment using virtual depth. A method comprises receiving a pre-rendered media file comprising a plurality of frames, receiving depth data related to the media file, wherein the depth data corresponds to each of the plurality of frames, creating an invisible three-dimensional ("3D") framework of a first frame of the media file based on the corresponding depth data, and rendering a new first frame in real time to include the pre-rendered first frame, one or more virtual visible 3D objects and the invisible 3D framework.

20 Claims, 3 Drawing Sheets

System 100

SYSTEMS AND METHODS FOR A GENERATING AN INTERACTIVE 3D ENVIRONMENT USING VIRTUAL DEPTH

BACKGROUND

Three-dimensional ("3D") computer graphics are graphics that use to create a 3D representation of geometric data that is stored in the computer for the purposes of performing calculations and rendering 2D images. Accordingly, such images may be stored for viewing later or displayed in real-time. 3D computer graphics rely on many of the same algorithms as 2D computer vector graphics in the wireframe model and 2D computer raster graphics in the final rendered display. In computer graphics software, the distinction between 2D and 3D may be narrow since 2D applications may use 3D techniques to achieve effects such as lighting, and 3D may use 2D rendering techniques.

3D computer graphics may often be referred to as 3D models. Apart from the rendered graphic, the 3D model may be contained within a graphical data file. However, one difference between 2D rendered images and 3D computer graphics is that a 3D model is the mathematical representation of any three-dimensional object. In other words, a model is not technically a graphic until it is displayed. A model may be displayed visually as a two-dimensional image through a process called 3D rendering or used in non-graphical computer simulations and calculations.

Rendering is the process of generating an image from a 2D or 3D model, or models in what collectively could be called a scene file or frame file, by means of computer programs. Furthermore, the results of such a model can be called a rendering. Accordingly, a scene file may contain objects in a strictly defined language or data structure while containing geometry, viewpoint, texture, lighting, and shading information as a description of the virtual scene. The data contained in the scene file is then passed to a rendering program to be processed and output to a digital image or raster graphics image file.

The current use cases of mixing video with real-time rendered 3D objects rely mostly on using the original video as a flat texture in a 3D environment. This is mainly due to pre-rendered videos losing all geometry, depth and camera information during the rasterization process. Rasterization is the task of taking an image described in a vector graphics format (e.g., shapes) and converting it into a raster image (e.g., pixels or dots) for output on a video display or printer, or for storage in a file format, such as, for example, bitmap.

SUMMARY

Described herein are apparatuses, systems and methods for generating an interactive 3D environment using virtual depth. The method may include receiving a pre-rendered media file comprising a plurality of frames, receiving depth data related to the media file, wherein the depth data corresponds to each of the plurality of frames, creating an invisible three-dimensional ("3D") framework of a first frame of the media file based on the corresponding depth data, and rendering a new first frame in real time to include the pre-rendered first frame, one or more virtual visible 3D objects and the invisible 3D framework.

Further described herein is a non-transitory computer readable storage medium with an executable program stored thereon, wherein the program instructs a processor to perform actions for generating an interactive 3D environment using virtual depth. The actions may include receiving a pre-rendered media file comprising a plurality of frames, receiving depth data related to the media file, wherein the depth data corresponds to each of the plurality of frames, creating an invisible three-dimensional ("3D") framework of a first frame of the media file based on the corresponding depth data, and rendering a new first frame in real time to include the pre-rendered first frame, one or more virtual visible 3D objects and the invisible 3D framework.

Further described herein is a system for generating an interactive 3D environment using virtual depth. The system may include a memory storing a plurality of rules, and a processor coupled to the memory and configured to perform actions that include receiving a pre-rendered media file comprising a plurality of frames, receiving depth data related to the media file, wherein the depth data corresponds to each of the plurality of frames, creating an invisible three-dimensional ("3D") framework of a first frame of the media file based on the corresponding depth data, and rendering a new first frame in real time to include the pre-rendered first frame, one or more virtual visible 3D objects and the invisible 3D framework.

DETAILED DESCRIPTION

Figure 1:
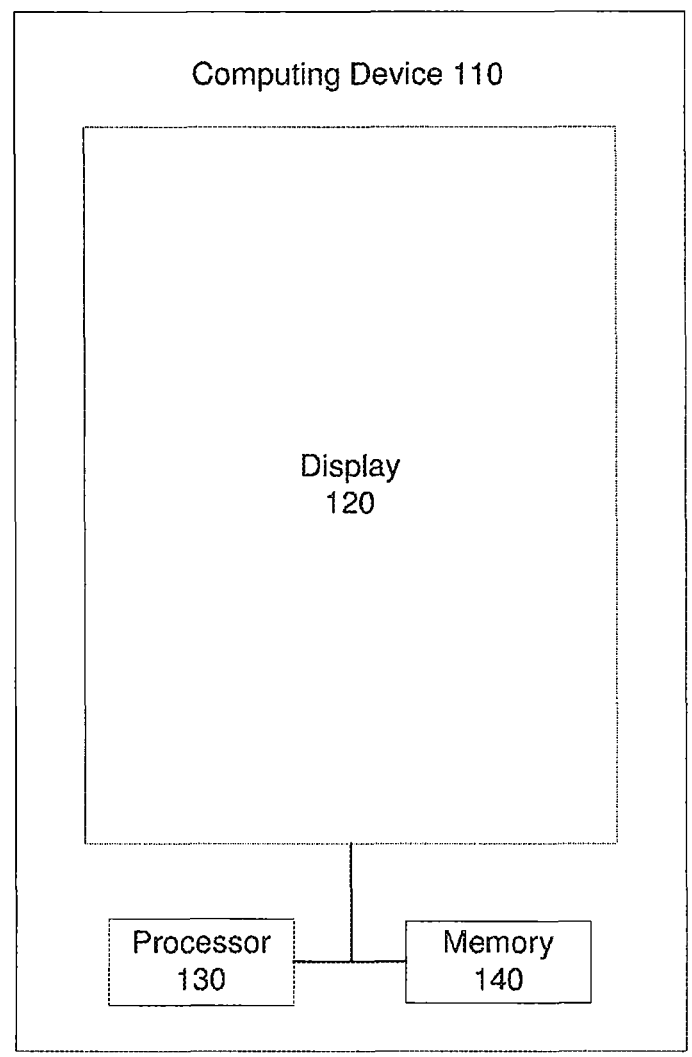
FIG. 1 shows a system for generating an interactive 3D environment using virtual depth according to an exemplary embodiment described herein.

The exemplary embodiments may be further understood with reference to the following description and the appended drawings, wherein like components are referred to with the same reference numerals. The exemplary embodiments show systems and methods for generating an interactive 3D environment using virtual depth. For instance, the systems and methods may create the interactive 3D environment wherein virtual 3D objects in an animated previous rendered (or "pre-rendered") video may seamlessly integrate and interact with 3D objects rendered in real-time.

The interactive 3D environments may be generated from a media file including one frame (e.g., a single image file) or a plurality of frames (e.g., a video file). The media file may further be generated for display via a processor operating software on a computing device. One skilled in the art will understand that the computing device may any type of computing device, such as, but not limited to, a tablet computer, a desktop computer, a laptop computer, a mobile phone, a personal digital assistant, etc. Furthermore, the exemplary embodiments described herein may relate to an application for generating 3D interactive environments on a computing device. However, one skilled in the art will also understand that the systems and methods described herein may be performed by either a stand-alone software package or an integrated software component executing on the computing device.

As noted above, the current implementations of mixing a source video with real-time rendered 3D objects are dependent on analyzing a source video as a flat, two-dimensional ("2D") texture. One of the reasons for this is due to the source video losing all of its geometrical data, depth data and camera data during the rasterization process. In other words, once the source video is rasterized and rendered, any information related to the 3D aspects of the frames within the video is not utilized or retained for additional applications.

As will be described in greater detail below, the exemplary systems and methods allow for an application to receive and understand the geometry, depth and camera information for every video frame in a media file. Furthermore, the application may use this information to create a virtual depth scene in which other newly rendered 3D objects (e.g., rendered in real-time) may interact therein. The interactions between the new 3D objects and the source video may include, but is not limited to, camera perspective and movement, lighting. Light sources, visual effects, surface properties, collision detection, object occlusion, rigid body dynamic, soft body dynamics, fluid dynamics, etc.

FIG. 1 shows an exemplary system 100 for generating an interactive 3D environment using virtual depth. The exemplary system 100 may include personal media device 110 (e.g., smartphone, tablet computer, etc.) equipped with a display 120, a processor 130 and a memory 140, such as a non-transitory computer-readable storage medium. The media device 110 may be a computing device such as, for example, tablet, smart phone, notebook computer, a desktop computer, laptop computer, home entertainment console, smart television, digital media player, etc.

The exemplary processor 130 may receive user input from the display 120 and/or through other components of the device 110 (e.g., keyboard, mouse, etc.). The exemplary memory 140 may store instructions, including instructions related to the above-described software application (e.g., media player application), executable by the processor 130. Therefore, a user of the device 110 may interact with the software application stored in the memory 140 of the device 110. The processor 130 may process these user interactions and adjust the content (e.g., a source media file). Furthermore, the memory 140 may further receive and store information pertaining to a source media file (e.g., image, video, etc.), such as, but not limited to geometrical data, depth data and camera data during the rendering and/or rasterization process.

Figure 2:
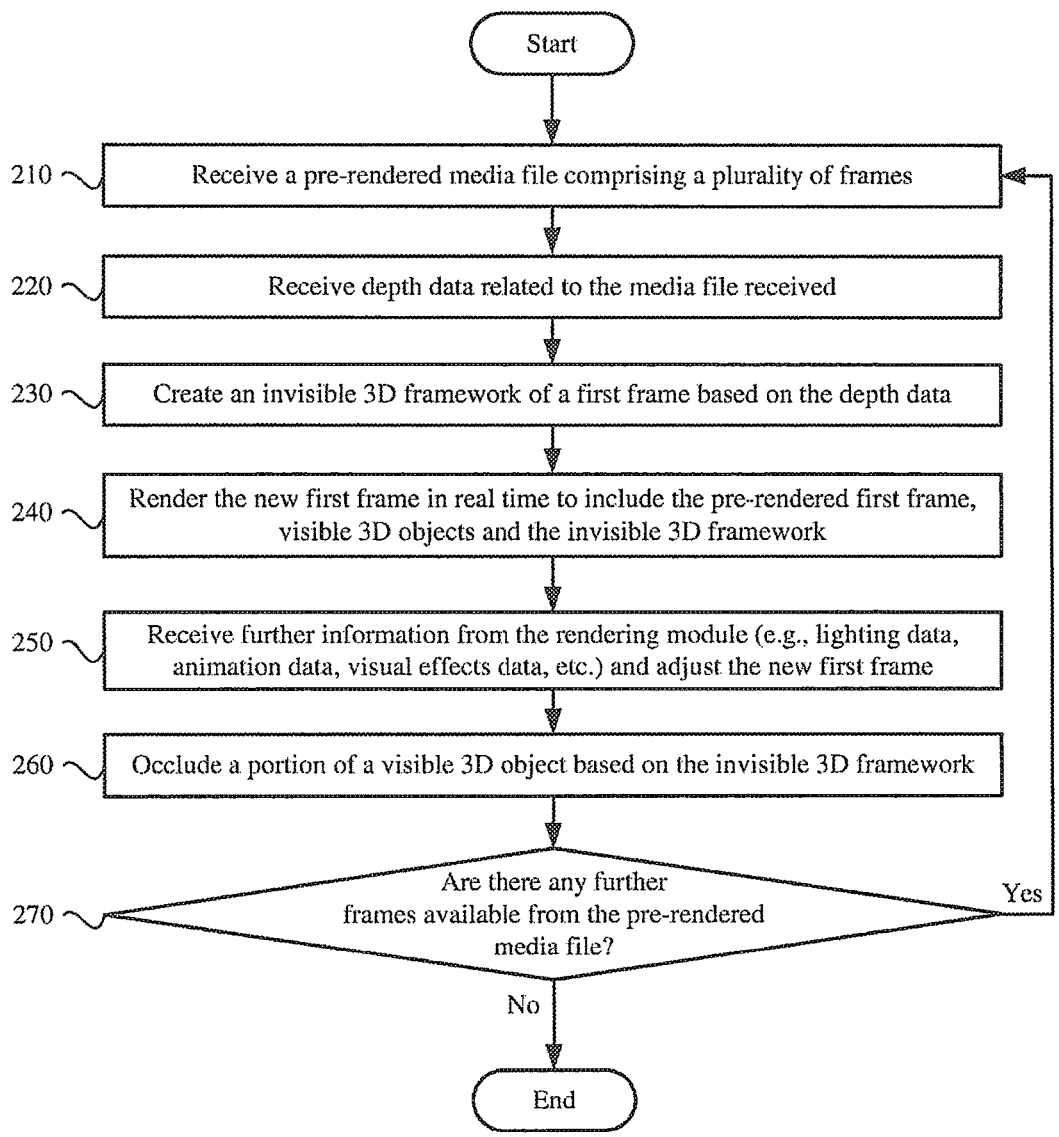
FIG. 2 shows a method for generating an interactive 3D environment using virtual depth according to an exemplary embodiment described herein.

FIG. 2 shows an exemplary method 200 for generating an interactive 3D environment using virtual depth according to an exemplary embodiment described herein. The steps performed by the method 200 will be described in reference to the exemplary system 100 and its various components as described above with reference to FIG. 1. For instance, the method 200 may be included as an application of a set of instructions executable by the processor 130 of the computing device 110.

In step 210, the method 200 may receive a source media file, such as a video file, an image file, etc., from a rendering module. For instance, the media player application may export a pre-rendered video file from an external rendering module that includes a plurality of frames. It is noted that while the exemplary method 200 interacts with an external rendering module, one skilled in the art will understand that the rendering module may also be an integrated component within systems, methods and applications described herein. In other words, the rendering module may be a stand-alone software application or a software component executing on the computing device 110.

In step 220, the method 200 may receive depth data related to the media file received from the rendering module. The depth data may correspond to each of the plurality of frames in the media file. For instance, this information may be received from the rendering module via a streaming file, such as a virtual depth stream file. More specifically, the processor 130 may receive information from the rendering module during the creation and rendering of a media file. The information may include, but is not limited to, 3D-related data for each frame such as camera position and movement information, a description of scene geometry, lighting and visual effects, animation information, scene parameters, etc. According to one example, the virtual depth stream information may be received as the source media file (e.g., video, image, etc.) is received in step 210. For example, as data pertaining to each frame in a video is received, the method 200 may receive corresponding virtual depth data on a frame-by-frame basis that provided details on the geometrical data and camera information for each frame.

According to an exemplary embodiment of the systems and methods described herein, data included within the virtual depth stream may be extracted from an original or source 3D media file, such as a scene in a video, that was used to render that media file. For instance, an external renderer may feature detailed information regarding scene geometry (e.g., mesh data, vertices, triangles, objects hierarchy, etc.), camera animation, objects animation, etc. Thus, the method 200 may extract the corresponding scene data by running a computer program or script designed for such data collection.

During the process of extracting the virtual depth stream, the method 200 may optionally simplify the mesh data as to make it more adequate for real-time usage. For instance, the source renderer (e.g., 3D modeling software) may offer an option to reduce the level of details for a particular 3D mesh. According, since virtual depth data may be used for rendering invisible 3D frameworks (e.g., elements that are unseen to the viewing user), it is not necessary to extract the virtual depth data with a high level of detail. In other words, the method 200 may not need all of the details included in the source media file from the renderer. Accordingly, 3D mesh data may be extracted with a much smaller number of polygons.

By reducing the amount of data and details extracted from the source media file, there may a significant reduction in required processing on the client side (e.g., the computing device 110) when handling this data and hence may allow for the method 200 to operate on lower-end devices, such as mobile phones.

With regard to camera animation and object animation, an exemplary source renderer may use keyframes to define animations. The method 200 may use these keyframes to define the transform of the camera (e.g., position, rotation, etc.) at certain discrete times, such as during playback of a video file, where these discrete times or media times specify a particular time in the video file. Between each of these keyframes, transform values may be interpolated by following a curve defined by the animator. Accordingly, the method 200 may extract the values associated with these keyframes as well as the curve formula in order to reproduce the exact animations in the newly generated interactive 3D environment, and thus match the camera movement in the video. Similar to camera animation, some objects in the rendered scenes may be animated. Accordingly, any animation for these objects may also be extracted using the same process defined above.

In step 230, the method 200 may create an invisible three-dimensional ("3D") framework of a first frame of the media file based on the corresponding depth data. It is noted that the exemplary invisible 3D framework may refer to a hidden framework or mesh of geometrical shape representing any number of objects in the original pre-rendered media file. The invisible framework may be hidden from display to a viewer during the real-time generation of the exemplary interactive 3D environment. Accordingly, the media player application may read the information received in step 220 and recreate the scene of the media file using an invisible framework that is aligned with the camera perspective. This scene may be referred to as a virtual depth scene.

In step 240, the method 200 may render the new first frame in real time to include the pre-rendered first frame, one or more virtual visible 3D objects and the invisible 3D framework into the pre-rendered source media file. The media player application may add visible 3D objects to the virtual depth scene that are aligned with the various elements of the source media file. In other words, the rendering of the new first frame in real time may include the alignment the invisible 3D framework with any number of pre-rendered objects in the pre-rendered first frame. Thus, these virtual 3D objects may also be depth-aware of the scene geometry within the frame of the media file.

For example, a real-time rendered 3D ball may bounce against a surface of a table in a source video by interacting with the hidden geometry of the invisible 3D framework inserted into the virtual depth scene. Since, the hidden geometry of the framework aligns with the objects of the pre-rendered source video (e.g., a couch or a table), it will provide the illusion of the newly inserted 3D object interacting with the objects within the source media file.

During the rendering process, the method 200 may synchronize the invisible 3D framework of the first frame into a new media file. As the media changes (e.g., a video file is played), the real-time camera, geometry and depth data may change according to the information within the virtual depth stream file. This allows the invisible 3D framework of the virtual depth scene to remain synchronized with the view of the source media file.

Since the source media file, such as a video file, is synchronized with the virtual depth scene at a frame-by-frame level, the media player application is capable of playing the new media file (e.g., an integrated video file) that includes very high quality pre-rendered scenes while the application is aware of the camera, geometry and depth information, as well as any changes to the information.

In step 250, the method 200 may receive further information from the rendering module, the further information including at least one of lighting data, animation data, visual effects data and frame parameters. Furthermore, the method 200 may adjust the display of the one or more virtual 3D objects based on the further information. For instance, the color and/or shading of above-mentioned 3D ball may be adjusted to a dark hue if the ball travels under the table in the source video, thereby presenting the illusion of a shadow on the ball.

In step 260, the method 200 may occlude at least a portion of the one or more virtual visible 3D objects in the new media file based on the invisible 3D framework. In other words, the media player application may occlude the real-time 3D objects of the virtual depth scene. More specifically, this may be achieved by having the hidden geometry of the invisible 3D framework act as a transparent mask. Thus, while the virtual depth geometry framework is not visible to a viewer, 3D objects that fall behind the framework in the virtual depth scene may be either partially or fully occluded depending on the camera information (e.g., camera angle, camera movement, etc.).

In step 270, the method 200 may determine that a further frame is available from the media file received from the rendering module and repeat steps 210-260. Accordingly, if there are additional frames available from the source media file, the method 200 may receive further depth data from the rendering module for these frames and create further invisible 3D frameworks within additional virtual depth scenes. Alternatively, if there are no further frames, the method 200 may end.

According to the exemplary embodiments of the systems and methods described herein, the newly created media file is rendered separately and composited after the virtual depth scene rendering is performed. Thus, elements may remain visible through the media player application through virtual depth masks. The final result provides the viewer with the illusion that real-time 3D objects are being rendered behind elements from the source video frame. An exemplary real-time 3D ball may be thrown behind a couch that only exists within the source video. The viewer may then see the ball become obstructed by the couch, thereby providing a believable depth illusion.

Figure 3:
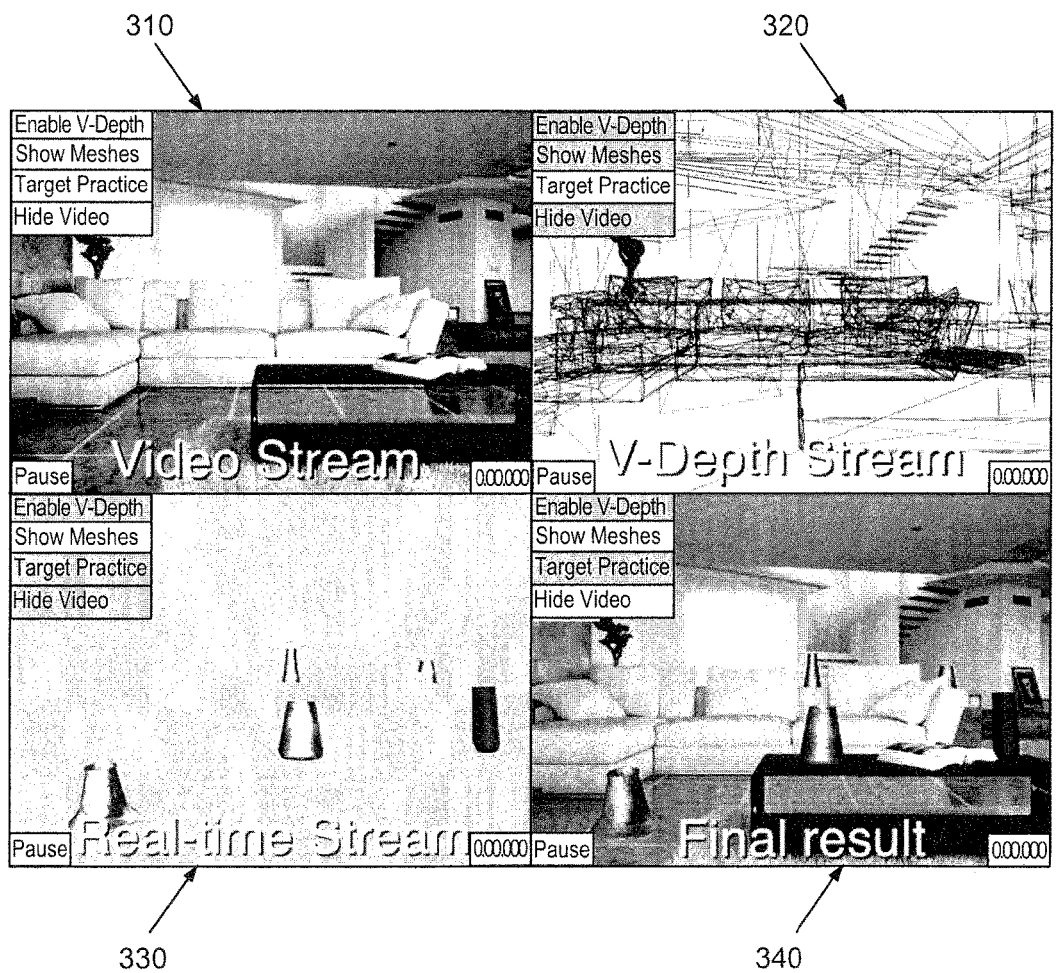
FIG. 3 shows a plurality of screen shots of a graphical user interface ("GUI") running a software application for generating an interactive 3D environment using virtual depth according to an exemplary embodiment described herein.

FIG. 3 shows a plurality of screen shots 310-340 of a graphical user interface ("GUI") running a software application for generating an interactive 3D environment using virtual depth according to an exemplary embodiment described herein. As noted above, the media player application on the device 110 may present an interactive 3D environment to the user via the display 120 wherein real-time rendered 3D objects interact with objects within a pre-rendered video, such as a video from an external source. Thus, each of the exemplary scene shots 310-340 may represent the different stages of a scene composition.

The screen shot 310 represents the original source media file. The original source media file may be a video of a set piece, such as a furnished living. The media file, as well as each of the objects of the set piece, may include observable 3D elements. For instance, the media file includes camera position and movement information, lighting information, etc. Additionally, the objects include geometry information, depth information, etc. As noted above, all of the information pertaining to the scene may be received by the media player application during the creation of a 3D invisible framework representing the objects within the set piece.

The screen shot 320 represents the virtual depth stream generated from the original source media file. More specifically, the virtual depth stream depicts the real-time 3D aspects of the each of the objects in the set piece while accounting for changes in the camera perspective during playback of the original media file. As shown in screen shot 320, a wireframe representation of the objects (e.g., couch, table, etc.) has been generated based on the physical characteristics of the objects. While this framework remains aligned with the camera movements and positioning, the framework is invisible to the viewer during playback. In other words, as the video is being played, the real-time changes to the camera information and object geometry/depth information remains synchronized with the view of the original media file.

The screen shot 330 represents the real-time stream of the 3D interactive objects. More specifically, the screen shot 330 depicts the insertion of real-time rendered 3D objects in to the original media file. As detailed above, these objects may be aware of the changes to the geometry and depth of the original object, as well as changes to the camera perspective. The awareness to such changes and characteristics is based on the wireframe representation of the objects generated in screen shot 320.

The screen shot 340 represents the final composition of the original source media file including the integrated 3D interactive objects. Accordingly, a real-time 3D object (e.g., a ball) may appear to interact with these original object (e.g., a couch), such as by bouncing off the object at realistic angles, rolling off the object at realistic endpoints, etc. In actuality, the real-time 3D object is interacting with the invisible framework of the objects generated in screen shot 320

The visual quality that may be achieved with pre-rendered videos is typically higher than the video quality achieved using real-time rendering. This is particularly true for devices that have limited processing capabilities, such as mobile devices. Therefore, by using the exemplary systems and methods described herein, it is possible to create a visual experience to the viewer that features superior visual quality while incorporating real-time 3D objects that interact with the source video.

According to the exemplary systems and methods described herein, the media player application may serve as a creative sandbox for delivering branded content to the user. The media player application may allow for new material to be introduced to a user base in a fun and interactive manner. For instance, the content may include spin-off content from existing programming, such as video game applications for non-interactive media content (e.g., television programming, streaming video files, etc.). By mixing pre-rendered videos and real-time elements, it become possible to create highly engaging and visually compelling interactive multimedia experiences for the viewer/user.

The newly generated media content may also serve as a companion component to additional content delivered through different mediums, such as allowing a user to decorate the set and/or characters in real-time while watching a media file (e.g., television programming). Thus, the content from the media player application may provide the user with a more in-depth, engaging, interactive and personalized viewing experience.

Furthermore, the exemplary systems and methods described herein may also be applied to virtual reality ("VR") applications. For instance, many VR experiences may be designed to be "on-rails" experiences having predetermined camera perspectives and camera movements (e.g., as the viewer transitions from one scene or set piece to the next). Thus, the addition of different real-time 3D interactive objects using the virtual depth scene described herein may create a high quality on-rails experience suitable for VR.

Those of skill in the art will understand that the above-described exemplary embodiments may be implemented in any number of matters, including as a media player application, as a software program, etc. For example, the exemplary method 200 may be embodied in a program stored in a non-transitory storage medium and containing lines of code that, when compiled, may be executed by a processor (e.g., processor 130 of computing device 110). Furthermore, one skilled in the art will understand that the exemplary software application may be coded in any computer readable language, such as, for example, a markup language (e.g., HTML5, etc.).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving a pre-rendered media file comprising a plurality of frames;
   receiving depth data related to the media file, wherein the depth data corresponds to each of the plurality of frames, the depth data based on an original media file from which the pre-rendered media file is generated;
   determining a mesh quality for which an invisible three-dimensional ("3D") framework is to be created, the mesh quality of the invisible 3D framework having a detail level less than a further mesh quality associated with the original media file;
   creating the invisible 3D framework of a first frame of the media file based on the corresponding depth data and the mesh quality; and
   rendering a new first frame in real time to include the pre-rendered first frame, one or more virtual visible 3D objects and the invisible 3D framework.

2. The method of claim 1, wherein the depth data includes camera perspective information and camera movement information.

3. The method of claim 1, wherein the depth data is received via a streaming data file from a rendering module.

4. The method of claim 1, further comprising:
   determining that a further frame is available from the media file received from the rendering module;
   receiving further depth data from the rendering module for the further frame; and
   creating a further invisible 3D framework of the further frame within the media file based on the depth data.

5. The method of claim 1, wherein the rendering of the one or more virtual visible 3D objects is based on the corresponding depth data of the media file.

6. The method of claim 1, further comprising:
   receiving further information related to the media file, the further information including at least one of lighting data, animation data, visual effects data and frame parameters; and
   adjusting the rendering of the one or more virtual visible 3D based on the further information.

7. The method of claim 1, wherein the rendering of the new first frame in real time includes aligning the invisible 3D framework with one or more pre-rendered objects in the pre-rendered first frame.

8. The method of claim 1, further comprising:
   occluding at least a portion of the one or more virtual visible 3D objects in the new first file based on the invisible 3D framework.

9. A non-transitory computer readable storage medium with an executable program stored thereon, wherein the program instructs a processor to perform actions that include:
   receiving a pre-rendered media file comprising a plurality of frames;
   receiving depth data related to the media file, wherein the depth data corresponds to each of the plurality of frames, the depth data based on an original media file from which the pre-rendered media file is generated;
   determining a mesh quality for which an invisible three-dimensional ("3D") framework is to be created, the mesh quality of the invisible 3D framework having a detail level less than a further mesh quality associated with the original media file;
   creating the invisible 3D framework of a first frame of the media file based on the corresponding depth data and the mesh quality; and rendering a new first frame in real time to include the pre-rendered first frame, one or more virtual visible 3D objects and the invisible 3D framework.

10. The computer readable storage medium of claim 9, wherein the depth data includes camera perspective information and camera movement information.

11. The computer readable storage medium of claim 9, wherein the actions further include:
   determining that a further frame is available from the media file received from the rendering module;
   receiving further depth data from the rendering module for the further frame; and
   creating a further invisible 3D framework of the further frame within the media file based on the depth data.

12. The computer readable storage medium of claim 9, wherein the rendering of the one or more virtual visible 3D objects is based on the corresponding depth data of the media file.

13. The computer readable storage medium of claim 9, wherein the actions further include:
   receiving further information from the rendering module, the further information including at least one of lighting data, animation data, visual effects data and frame parameters.

14. The computer readable storage medium of claim 9, wherein the rendering of the new first frame in real time includes aligning the invisible 3D framework with one or more pre-rendered objects in the pre-rendered first frame.

15. The computer readable storage medium of claim 9, wherein the actions further include:
   occluding at least a portion of the one or more visible 3D objects in the new media file based on the invisible 3D framework.

16. A system, comprising:
   a memory storing a plurality of rules; and
   a processor coupled to the memory and configured to perform actions that include:
      receiving a pre-rendered media file comprising a plurality of frames;
      receiving depth data related to the media file, wherein the depth data corresponds to each of the plurality of frames, the depth data based on an original media file from which the pre-rendered media file is generated;
      determining a mesh quality for which an invisible three-dimensional ("3D") framework is to be created, the mesh quality of the invisible 3D framework having a detail level less than a further mesh quality associated with the original media file;
      creating the invisible 3D framework of a first frame of the media file based on the corresponding depth data and the mesh quality; and
      rendering a new first frame in real time to include the pre-rendered first frame, one or more virtual visible 3D objects and the invisible 3D framework.

17. The system of claim 16, wherein the processor is further configured to perform:
   determining that a further frame is available from the media file received from the rendering module;
   receiving further depth data from the rendering module for the further frame; and
   creating a further invisible 3D framework of the further frame within the media file based on the depth data.

18. The system of claim 16, wherein the rendering of the one or more virtual visible 3D objects is based on the corresponding depth data of the media file.

19. The system of claim 16, wherein the rendering of the new first frame in real time includes aligning the invisible 3D framework with one or more pre-rendered objects in the pre-rendered first frame.

20. The system of claim 16, wherein the processor is further configured to perform:
   occluding at least a portion of the one or more visible 3D objects in the new media file based on the invisible 3D framework.

* * * * *